United States Patent [19]

Harris

[11] Patent Number: 4,676,390

[45] Date of Patent: Jun. 30, 1987

[54] PRESSURE-RELEASE FUEL CAP

[75] Inventor: Robert S. Harris, Connersville, Ind.

[73] Assignee: Stant Inc., Connersville, Ind.

[21] Appl. No.: 888,575

[22] Filed: Jul. 22, 1986

[51] Int. Cl.⁴ .............................................. B65D 51/16
[52] U.S. Cl. .................................. 220/203; 220/303;
220/DIG. 33; 220/209
[58] Field of Search ............... 220/203, 206, 208, 209,
220/288, 303, 304, DIG. 32, DIG. 33;
137/493.9, 315, 493

[56] References Cited

U.S. PATENT DOCUMENTS

| | | |
|---|---|---|
| 2,006,752 | 7/1935 | Swank . |
| 2,591,562 | 4/1952 | Levell . |
| 2,792,964 | 5/1957 | Reese et al. . |
| 2,865,531 | 12/1958 | Gorst et al. . |
| 2,964,214 | 12/1960 | Stannard . |
| 2,990,971 | 7/1961 | Enell . |
| 3,082,905 | 3/1963 | Friend . |
| 3,098,636 | 7/1963 | Contella . |
| 3,111,239 | 11/1963 | Ivins . |
| 3,112,840 | 12/1963 | Miller et al. . |
| 3,147,881 | 9/1964 | Friend . |
| 3,163,315 | 12/1964 | Wilson . |
| 3,186,580 | 6/1965 | Previte . |
| 3,203,445 | 8/1965 | McCormick . |
| 3,373,894 | 3/1968 | Johnson . |
| 3,434,621 | 3/1969 | Previte . |
| 3,587,912 | 6/1971 | Ohta et al. . |
| 3,616,960 | 11/1971 | Miller . |
| 3,703,245 | 11/1972 | Brewer . |
| 3,854,911 | 12/1974 | Walker . |
| 4,036,399 | 7/1977 | Gerdes . |
| 4,245,751 | 1/1981 | Neiman . |
| 4,271,976 | 6/1981 | Detwiler . |
| 4,498,493 | 2/1985 | Harris ................... 220/203 |
| 4,572,396 | 2/1986 | Kasugai et al. ........ 220/203 |
| 4,579,244 | 4/1986 | Fukuta . |
| 4,588,102 | 5/1986 | Kasugai et al. ........ 220/203 |

Primary Examiner—George T. Hall
Attorney, Agent, or Firm—Barnes & Thornburg

[57] ABSTRACT

A fuel cap is provided for use in a threaded filler neck of a fuel system. The fuel cap includes a shell providing a hand grip and a closure rotatably engaging the threaded filler neck for closing the filler neck. The closure includes a seal for establishing a sealing engagement between the closure and the filler neck to block the escape of fuel and fuel vapor in the filler neck to the atmosphere. The cap also includes a pressure-vacuum valve assembly that extends through the closure for venting pressurized fuel vapor in the filler neck through the closure. The cap further includes an actuator providing an operative connection between the shell and the valve assembly so that rotation of the shell relative to the filler neck in a cap-removal direction will actuate the valve assembly. Such actuation enables pressurized fuel vapor to be vented from the filler neck prior to substantially rotating the closure relative to the filler neck and breaking the sealing engagement established between the closure and the filler neck. Preferably, the valve assembly includes a vacuum-relief valve operable by the actuator to release pressure in the filler neck. The closure also includes a frangible section that cooperates with an ejection system to urge the shell and the actuator away from valve assembly during a fuel cap breakaway accident.

42 Claims, 12 Drawing Figures

PRESSURE-RELEASE FUEL CAP

BACKGROUND AND SUMMARY OF THE INVENTION

The present invention relates to fuel caps for closing filler necks of vehicle fuel tanks. More particularly, the present invention relates to a threaded fuel cap that enables fuel vapor to vent from the tank upon rotation of the fuel cap in the removal direction.

Conventional fuel caps for closing the filler neck of vehicle fuel tanks generally include a pressure-vacuum valve located in the cap to control the pressure within the fuel tank. Whenever the pressure within the tank reaches a predetermined superatmospheric level, the pressure valve portion of the pressure-vacuum valve automatically opens to prevent excess pressure build up. Whenever the pressure within the tank drops to a predetermined subatmospheric level, the vacuum valve portion of the pressure-vacuum valve opens to equalize the pressure in the tank.

The pressure-vacuum valve in a conventional fuel cap must be adjusted so that the potential for some vapor pressure to remain in the fuel tank exists at all times. Generally, the pressure maintained within the fuel tank is in the range of 1-2 psi. This retention of some level of fuel vapor in the tank is desired for several reasons, and normally does not create any problems. However, under certain conditions, pressure from fuel vapor can result in fuel and fuel vapor escaping from the filler neck once the fuel cap is removed. This rapid escape, or surge, of the fuel and fuel vapor from the filler neck after cap removal can result in emission of a potentially dangerous fuel vapor concentration level in the region surrounding the filler neck, as well as the possibility that the person removing the cap could be injured by hot fuel spray.

With larger fuel tanks now being utilized in many vehicles, and, particularly, with the use of newer, more volatile blends of fuel having higher than normal Reid vapor pressure, more than normal fuel vapor pressure may be generated in these fuel tanks, particularly in warm or hot weather or after the vehicle has been running. Therefore, it would be advantageous to provide a fuel cap that will enable fuel vapor to be vented from the fuel tank sometime during the cap removal operation, but before the cap is actually removed from the filler neck. Ideally, when the cap is used in the manner described hereinafter, this venting will be a controlled, metered venting of the fuel vapor with the fuel vapor being directed away from the operator.

Threaded caps that engage threads in the filler neck of vehicles are now widely used because of their ease of installation and removal, and because of their excellent sealing characteristics. Therefore, it would be advantageous to provide a fuel cap that will enable the fuel tank to be vented in a controlled manner upon rotation of the cap in the cap removal direction to allow the fuel vapor to be vented before the cap is removed Most conventional threaded fuel caps include a primary seal that is adapted to engage a sealing lip on the filler neck when the cap is rotated fully in the cap installation direction. These conventional threaded fuel caps generally have an outer cover that is configured to be gripped by the operator to rotate the cap. Because unseating of the primary seal can result in a surge of fuel and fuel vapor from the filler neck in warm or hot weather, or after the vehicle has been running, it would also be advantageous to provide a fuel cap that enables fuel vapor to be vented from the tank in a controlled manner upon rotation of the outer cover before the seal between the primary seal and the filler neck is broken.

It is therefore one object of the present invention to provide a fuel cap that will enable fuel vapor to be vented from the fuel tank before the fuel cap is removed from the filler neck.

Another object of the present invention is to provide a fuel cap that will enable fuel vapor to be vented from the tank automatically during a portion of the cap removal procedure.

Yet another object of the present invention is to provide a fuel cap that will enable fuel vapor to be vented from the tank in a controlled manner while maintaining the primary seal between the fuel cap and the filler neck.

Still another object of the present invention is to provide a fuel cap having a controlled release fuel vapor venting system that enables fuel vapor to be dissipated during cap removal so as to reduce the concentration of fuel vapor in the local region surrounding the filler neck, as well as reduce the risk of expulsion of fuel from the filler neck.

According to the present invention, a fuel cap is provided for use in a threaded filler neck of a fuel system. The fuel cap includes shell means for providing a hand grip and closure means for rotatably engaging the threaded filler neck for closing the filler neck. The closure means includes seal means for establishing a seal with the filler neck to block the escape of fuel and fuel vapor in the filler neck to the atmosphere. The cap also includes pressure-relief means extending through the closure means for venting pressurized fuel vapor in the filler neck through the closure means. The cap further includes actuation means for providing an operative connection between the shell means and the pressure-relief means so that rotation of the shell means relative to the filler neck in a cap-removal direction will actuate the pressure-relief means without substantially rotating the closure means relative to the filler neck and breaking the seal established by the seal means.

One feature of the present invention is that the actuation means provides an operative connection between the shell means and the pressure-relief means so that rotation of the shell means relative to the filler neck in a cap-removal direction will actuate the pressure-relief means. One advantage of this feature is that rotation of the shell means in a cap-removal direction automatically actuates the pressure-relief means to enable the fuel vapor to be vented from the tank.

Another feature of the present invention is that the fuel cap produces an audible hissing sound as fuel vapor escapes through the closure means upon actuation of the pressure-relief means. Advantageously, this hissing sound provides an indication to the operator that fuel vapor is being vented and that continued rotation of the shell means in the cap removal direction should be delayed until the sound has ceased.

Another feature of the present invention is that the shell means and the actuation means cooperate to actuate the pressure-relief means without substantially rotating the closure means relative to the filler neck and breaking the seal established by the seal means. One advantage of this feature is that the seal established by the seal means between the closure means and the filler neck is maintained until the fuel vapor is vented from the tank. This permits venting of the fuel vapor from the tank in a controlled manner.

In preferred embodiments of the present invention, the shell means and the closure means cooperate to define outlet-deflector means for discharging fuel vapor vented through the closure means via the pressure-relief means from the cap to a region outside of the filler neck in a direction toward the filler neck and generally away from a person manually rotating the shell means.

One feature of the foregoing structure is that outlet-deflector means are provided for directing the flow of fuel vapor from the cap. One advantage of this feature is that the vented fuel vapor is directed toward the filler neck and away from the person manually rotating the shell means.

Also in preferred embodiments of the present invention, the actuation means includes a drive hub that is coupled to the shell means, a plunger that is axially movable in the closure means between an inactive position and a vacuum-relief valve-actuating position, and first camming means interconnecting the drive hub and the plunger for urging the plunger in an axial direction toward its vacuum-relief valve-actuating position in response to rotation of the drive hub in the cap-removal direction.

One feature of the foregoing structure is that rotation of the shell means in the cap-removal direction rotates the drive hub which interconnects with the plunger through camming means to urge the plunger in a direction to actuate the vacuum-relief valve. One advantage of this feature is that the vacuum-relief valve is automatically actuated upon rotation of the shell means in the cap-removal direction.

Advantageously, the camming means can be configured to control sequentially the actuation of the vacuum-relief valve and the disengagement of the closure means from the filler neck as a function of the angular movement of shell means relative to the filler neck. Crashworthiness of the fuel cap is improved by imposing a slight delay in valve actuation. Furthermore, following the slight delay, the pressurized fuel vapor is released to the atmosphere over a maximized period of time, due, in part, to the subsequent quick opening of the valve by the plunger followed by a "lost motion" time delay prior to establishing a driving connection between the shell means and the closure means. This extra time allows the fuel vapor to be released, diffused, or dissipated in a direction toward the vehicle itself without reaching high fuel vapor concentrations in the vicinity occupied by the user during cap removal.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE DRAWINGS

Figure 1:
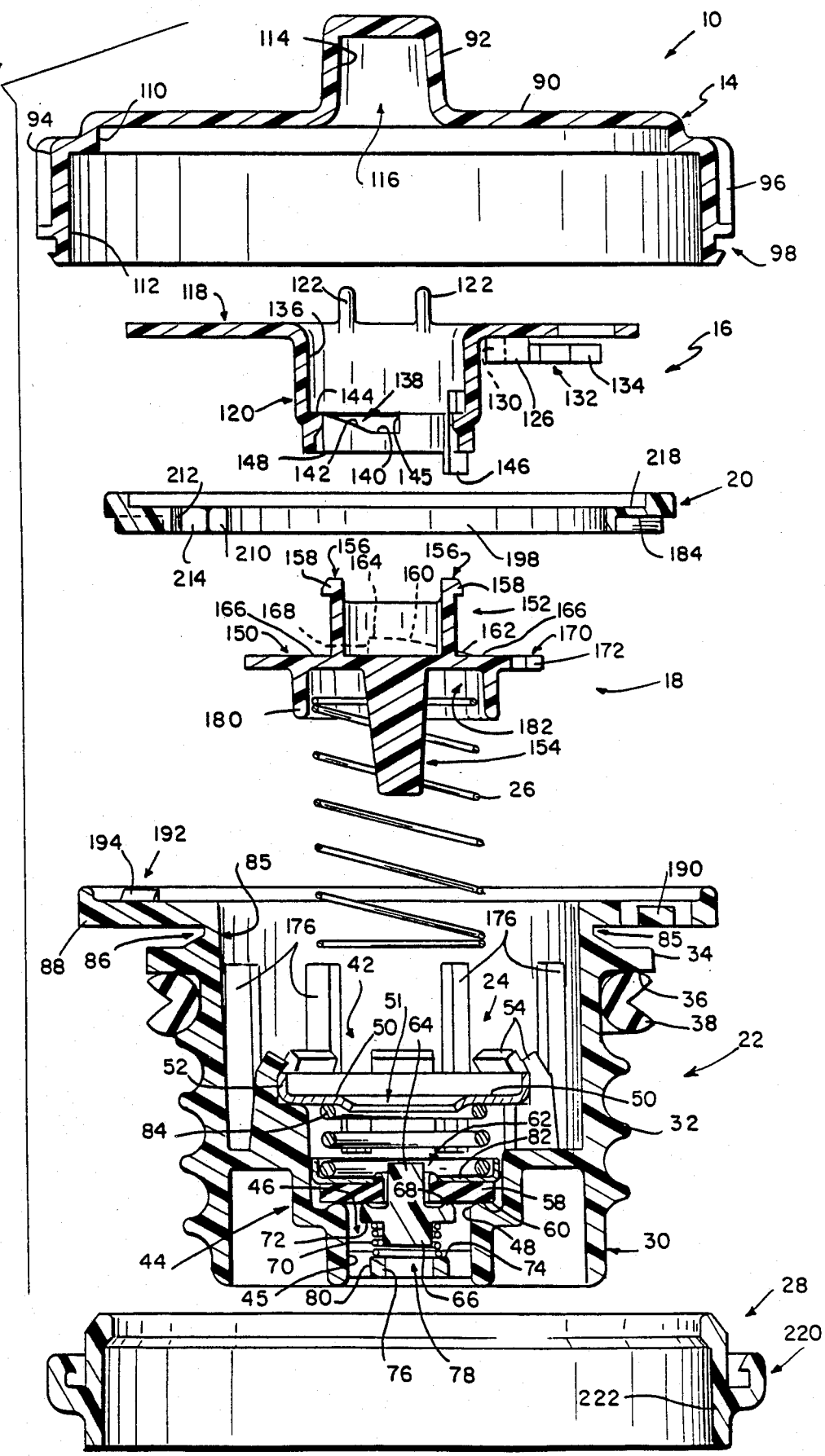
FIG. 1 is an exploded assembly view in section of a preferred embodiment of the fuel cap of the present invention.
Figure 2:
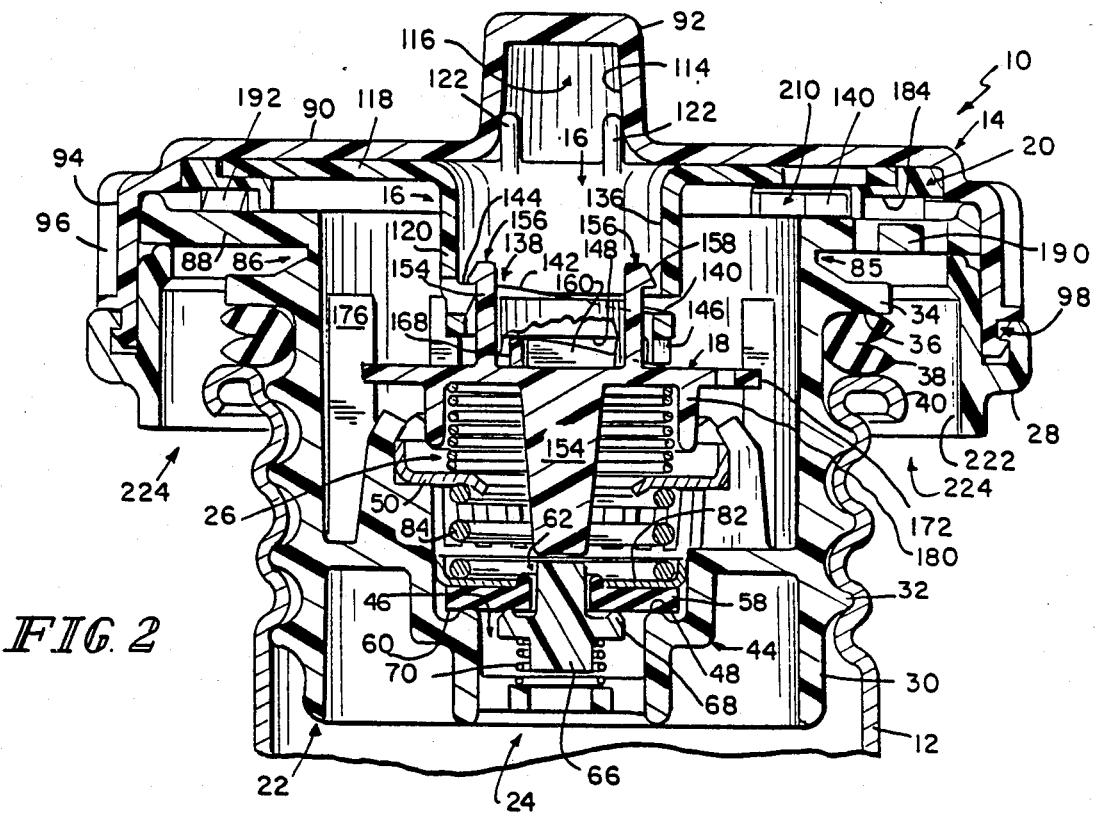
FIG. 2 is a transverse sectional view of the fuel cap of FIG. 1 showing the vacuum-relief valve in its normally closed position.
Figure 3:
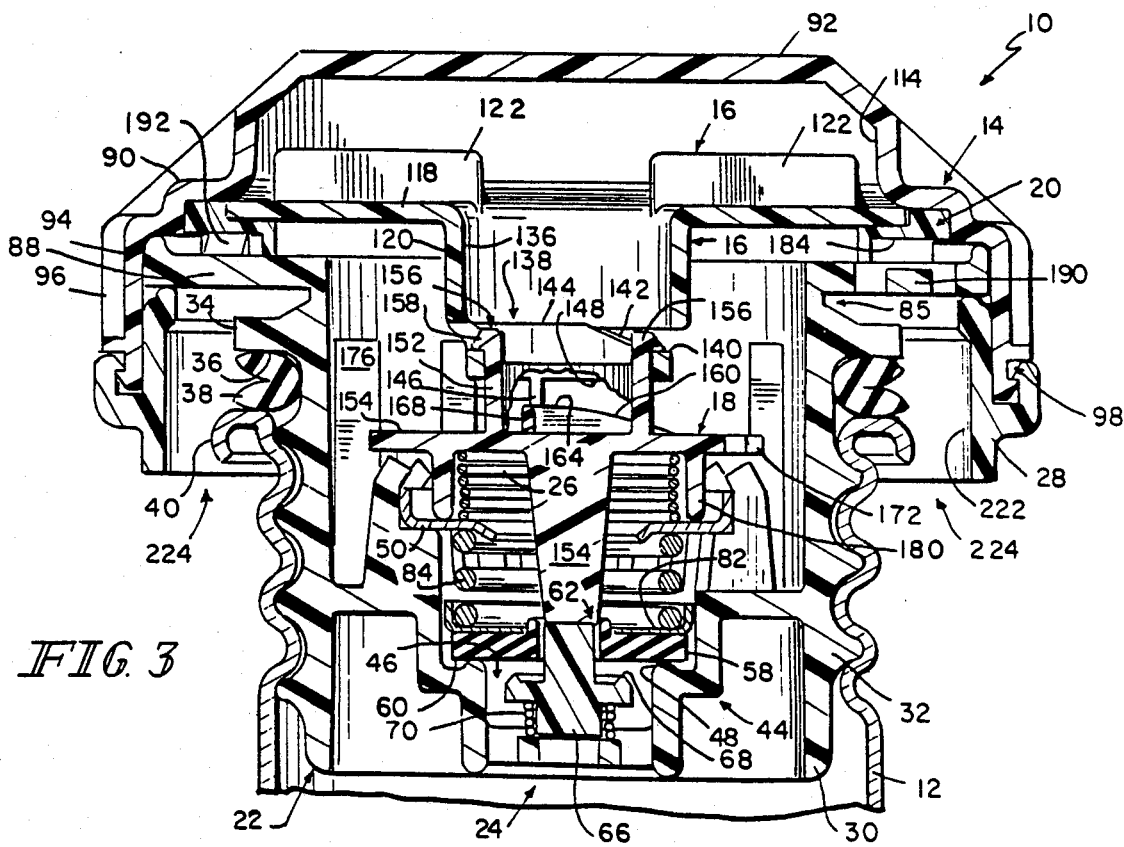
FIG. 3 is a view similar to that of FIG. 2 showing downward movement of the plunger to actuate the vacuum-relief valve in response to rotation of the outer shell in a cap-removal direction without breaking the primary seal provided between the cap and the filler neck.

A pressure-release fuel cap 10 for closing a filler neck 12 of a vehicle or other fuel system is illustrated in FIGS. 1–3. An actuation system within the fuel cap 10 enables fuel vapor pressure in the filler neck 12 to be vented in response to rotation of a portion of cap 10 relative to filler neck 12 prior to removal of the fuel cap 10 from the filler neck 12. A deflection system diffuses pressurized fuel vapor vented from fuel neck 12 in directions generally away from a person gripping the cap 10 in response to rotation of cap 10 in the cap-removal direction. Such actuation and deflection systems advantageously enable fuel vapor to be vented in a controlled manner.

Referring to FIG. 1, fuel cap 10 includes a shell 14, a drive hub 16, a plunger 18, a race 20, a closure 22, and a pressure-vacuum valve assembly 24, a breakaway spring 26, and a retainer 28. The closure 22 has an axially inwardly-extending shank portion 30 which is threaded as indicated at 32 to engage the threaded filler neck 12. Radially outwardly-extending flange 34 is formed on the axially upper end of housing 22 above threads 32. Flange 34 includes a shoulder 36 for capturing an O-ring gasket 38 between an upper lip 40 of filler neck 12 and shoulder 36. The gasket 38 cooperates with the shoulder 36 and the upper lip 40 to seal the filler neck 12 so that the fuel and fuel vapor is unable to escape from the fuel tank (not shown) around closure 22 in the space between closure 22 and filler neck 12 as long as the fuel cap 10 is properly mounted on filler neck 12.

Closure 22 further includes a vent passageway 42. The vent passageway 42 is generally cylindrical and is formed by a pressure-vacuum valve housing 44 into which the pressure-vacuum valve assembly 24 is installed. Assembly 24 aids in controlling the flow of fuel vapors through housing 44 and controls venting of pressure and relief of vacuum which develop within the fuel tank while cap 10 is mounted on filler neck 12. The housing 44 includes an axially outwardly-facing, radially inwardly-extending surface 45 formed to include a vent opening 46 for venting fuel vapor and admitting ambient air and a valve seat 48 surrounding vent opening 46.

The valve assembly 24 is retained within the housing 44 by a circular retainer 50. The retainer 50 includes an axially outwardly-extending annular flange 52. The retainer 50 is axially constrained by a plurality of axially outwardly-extending, radially inwardly-slanted fingers 54 provided by housing 44. The fingers 54 cooperate to engage the annular flange 52. The retainer 50 further includes a central circular aperture 51. Pressure release is accomplished through the vent passageway formed by housing 54 and through the aperture provided in retainer 50.

Continuing to refer to FIG. 1, the pressure-vacuum valve assembly 24 controls the venting of fuel vapor at a predetermined superatmospheric pressure out of the fuel tank (not shown) through the vent passageway 42 formed by housing 44 and between the closure member 22 and the shell 14 of cap 10 to the atmosphere. The assembly 24 also controls the entry of air through the vent passageway 42 formed by housing 44 into the fuel tank when the pressure in the fuel tank decreases to a predetermined subatmospheric level.

The pressure-vacuum valve assembly 24 includes a circular pressure-release valve member or gasket 58 including a circular, axially inwardly-facing planar surface 60 which seats against the valve seat 48 to close the vent opening 46. The pressure-release valve member 58 includes a central circular aperture 62. In a preferred embodiment, the circular axially inner surface 60 of valve member 58 is exposed to the fuel vapor Pressure within the fuel tank.

An axially outwardly-extending guiding stem portion 64 of a vacuum-relief valve member 66 is received in the aperture 62, holding valve member 66 in alignment in the valve assembly 24. The valve member 66 includes an annular, axially outwardly-facing valve edge 68 which cooperates with a seat region on the axially inner surface 60 of the pressure-release valve member 58. Valve edge 68 is held against the axially inner surface 60 by a vacuum-relief control spring 70 disposed between an axially inwardly-facing surface 72 of the valve member 66 and the bottom 74 of a spring retainer cup 76 provided at the axially inner end of the housing 44. Spring 70 has a predetermined spring constant which allows the valve member 66 to be urged in opposition to the spring 70 in response to a predetermined subatmospheric pressure within the fuel tank (not shown) to open the aperture 62 and allow air to pass through the housing 44 into the fuel tank. A venting aperture 78 is provided at the bottom 74 of the spring retainer cup 76 for venting air and pressure into and out of the fuel tank. In addition, retainer cup 76 contains four radially disposed openings 80 to provide additional area for flow of vapor and/or air.

The pressure-vacuum valve assembly 24 further includes a circular pressure-release control or stiffener plate 82 for controlling the flow of fuel vapor through the housing 44 when the pressure-release valve member 58 is unseated to its open position (not shown) in response to a predetermined superatmospheric pressure in the tank. The control plate 82 is seated on the axially outer surface of the pressure-release valve member 58.

The axially inner surface 60 of the valve member 58 is yieldably urged against the valve seat 48 provided on the axially outward-facing surface of the housing 44, and the control plate 82 is urged against the axially outer surface of valve member 58 by pressure-release control spring 84. Spring 84 is held in place between the control plate 82 and the retainer 50. Control spring 84 has a spring constant for yieldably urging the valve member 58 against the valve seat 48 normally to close the vent opening 46 in the housing 44. In its closed position, the pressure-release valve member 58 provides a seal between the planar surface 60 and the valve seat 48 until the pressure in the fuel tank reaches a predetermined superatmospheric pressure. Such a pressure level gives rise to an axially outward force which acts against the axially inner surface of the valve member 58. Responding to this force, the valve member 58 is urged axially outward, in opposition to spring 84, to open the vent passageway 42. Axially outward movement of the venting valve member 58 can occur relatively quickly in order to open the vent passageway rapidly.

Continuing to refer to FIG. 1, closure 22 includes a frangible portion 85 on an axially upper portion of shank 30. Frangible portion 85 is configured to break away when the shell 14 is exposed to an impact. This breakaway occurs without disrupting the fuel vapor seal provided by gasket 38 between the cap 10 and filler neck 12. The shank 30 is formed to include a groove 86 in its outer surface above sealing flange 34. A radially outwardly-extending flange 88 is cantilevered on the shank 30 in a region above groove 86. When shell 14 is subjected to an impact, the frangible portion 85 of shank 30 will fracture along groove 86 causing the entire flange 88 and shell 14 to be severed from fuel cap 10. One advantage of this feature is that the remaining portion of closure 22 including flange 34 will remain intact to seal filler neck 12, thereby reducing the likelihood of gasoline spillage during an accident.

Figure 12:
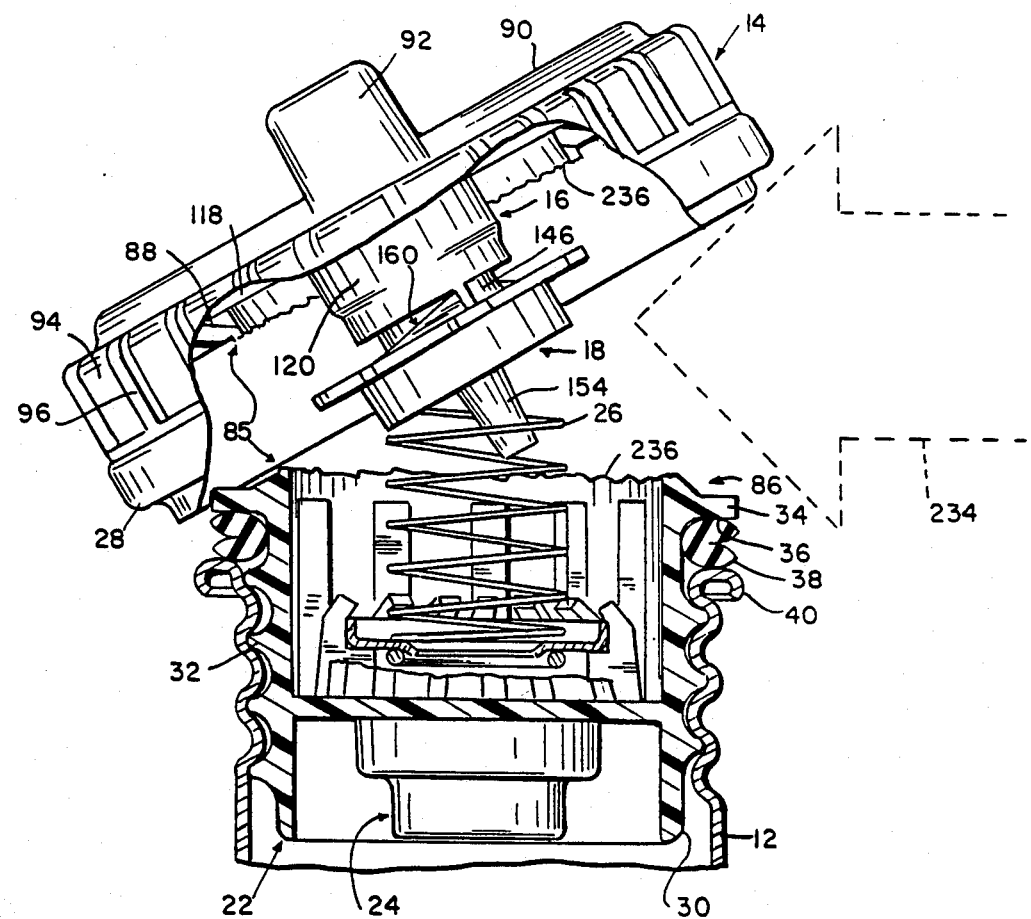
FIG. 12 is a view similar to that of FIG. 2 with portions broken away showing fracture of a frangible portion of the closure during an impact or crash.

Illustratively, shell 14, drive hub 16, plunger 18, and race 20 are interconnected in the manner described below to provide a subassembly that is yieldably biased away from closure 22 by breakaway spring 26. As long as cap 10 remains intact, spring 26 functions to minimize "rattle" of the cap components 16, 18, and 20 with cap 10, thereby quieting the cap 10 and reducing rattle-induced wear of cap components. However, during a breakaway impact, spring 26 urges the interconnected cap subassembly 14, 16, 18, and 20 in an axially-outward direction away from the sensitive and easily damaged pressure-vacuum valve assembly 24 as shown in FIG. 12. This feature advantageously aids in reducing the likelihood of gasoline spillage that might otherwise occur if the valve assembly 24 was damaged during an accident involving a breakaway situation.

Referring to FIGS. 1-3, it will be appreciated that shell 14, drive hub 16, plunger 18, and race 20 cooperate to provide a lost motion driving connection between the shell 14 and the closure 22. Such an operative connection establishes means for actuating the vacuum-relief valve member 66 in response to rotation of the shell 14 in the cap removal direction. Such actuation enables the fuel vapor pressure in the filler neck 12 and the fuel tank (not shown) to be normalized prior to removal of the fuel cap from the filler neck 12. In operation, valve member 66 is urged against control spring 70, as shown in FIG. 3, thereby opening aperture 62 in pressure-release valve member 58 to enable the fuel vapor in the filler neck 12 to be vented without substantially rotating closure 22 relative to filler neck 12 and breaking the seal provided by gasket 38.

Shell 14 provides a hand grip enabling a person to grip and rotate fuel cap 10 manually. Shell 14 includes a top exterior surface 90 configured to provide a raised operating handle 92 and a sidewall 94 depending from the peripheral edge of top surface 90. Side wall 94 is formed to include easily gripped, circumferentially-spaced ribs 96. Side wall 94 also includes an axially-lower, circumferentially-extending mounting region 98 for engaging retainer 28. Shell 14 is hollow and includes a first interior wall 110 defining a space for rotatably receiving race 20 and an axially lower second interior wall 112 defining a space for rotatably receiving the axially uppermost flange 88 of closure 22. Handle 92 is also hollow and includes an interior wall 114 defining a recess 116 for receiving a driven portion 122 of the drive hub 16.

Figure 4:
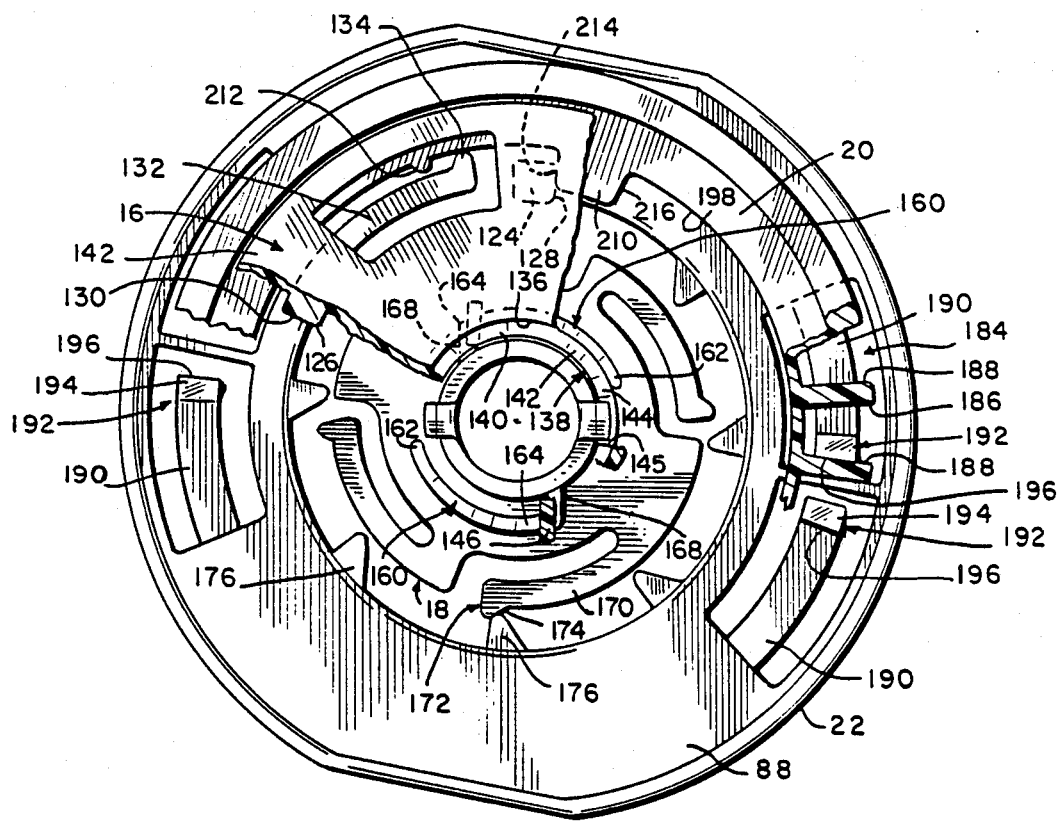
FIG. 4 is a top plan view of the fuel cap with the shell removed and portions broken away for the purpose of clarity.
Figure 5:
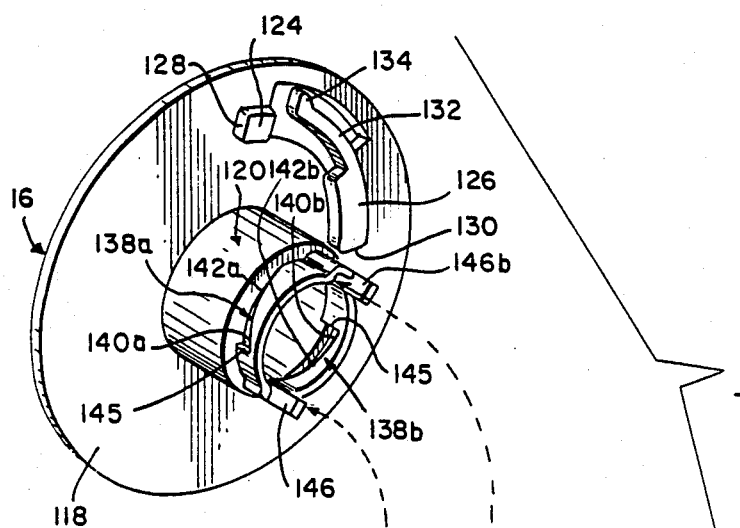
FIG. 5 is an exploded perspective view of a subassembly of the fuel cap showing one technique for assembling a drive hub and a valve-actuating plunger.
Figure 5:
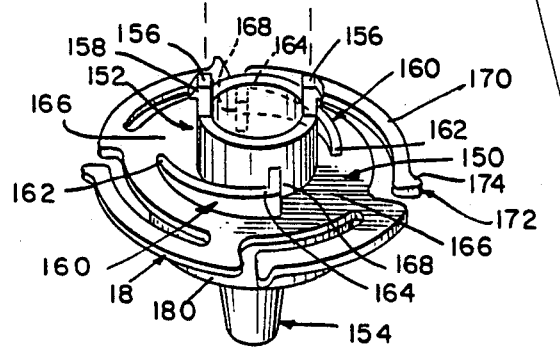

Drive hub 16 is best seen in FIGS. 1, 4, and 5, and includes a top disc 118 and a cylindrical skirt 120 of reduced diameter depending from a center portion of top disc 118. Drive hub 16 includes two pair of axially upwardly-extending drive blades 122 on top disc 118. Drive blades 122 extend into handle recesses 116 and engage interior wall 114 to provide a driving connection between shell 14 and drive hub 16. Due to this driving connection, drive hub 16 always rotates in response to rotation of shell 14 by a person installing cap 10 on or removing cap 10 from filler neck 12.

Drive hub 16 also includes first and second drive members 124, 126 which depend from a radially outer region of the underside of disc 118, as shown best in FIG. 5, to provide means for applying a rotation-inducing driving torque to race 20. First drive member 124 includes a drive surface 128 operative during installation of cap 10 on filler neck 12. Second drive member 126 includes a drive surface 130 operative during removal of cap 10 from filler neck 12.

Drive hub 16 further includes a resilient anti-drift finger 132 having a proximal end attached to second drive member 126 as seen best in FIG. 5 and a distal end provided with a pawl tooth 134. As will be apparent from the description below, pawl tooth 134 of anti-drift finger 132 loosely engages race 20 to block or otherwise inhibit drifting rotation of drive hub 16 when cap 10 is mounted on filler neck 12, thereby reducing noise rattle and wear on components (e.g. plunger 18, pressure-vacuum valve assembly 24, etc. . . .) in cap 10 that communicate with drive hub 16.

Skirt 120 of drive hub 16 is connected to plunger 18 by means of a camming system which positively moves plunger 18 (1) downwardly toward its vacuum-relief valve-activating position shown in FIG. 3 in response to rotation of drive hub 16 in the cap-removal direction, and, (2) upwardly toward its inactive position shown in FIG. 2 in response to rotation of drive hub 16 in the cap-advancing direction. Skirt 120 includes an interior wall 136 and a serially arranged pair of radially inwardly-extending, axially upwardly-facing cylindrical cam surfaces 138 as shown best in FIG. 5. Each cam surface 138 peripherally extends approximately 180° on the interior wall 136 about the central axis of cylindrical skirt 120. As shown best in FIG. 5, each cam surface 138$a,b$ is divided into a lower flat section 140$a,b$; an intermediate helical ramp section 142$a,b$; and an upper flat section 144$a,b$. Each cam surface 138$a,b$ further includes an axially upwardly-extending first stop wall 145 as seen best in FIG. 1 and FIGS. 6-11. Each first stop wall 145 interconnects the lower flat section 140 of one of cam surfaces 138$a,b$ to the upper flat section 144 of the other of the cam surfaces 138$a, b$. Skirt 120 further includes a pair of diametrically opposed knife edge cam drivers 146 extending in an axially-downward direction from the lowermost rim 148 of skirt 120.

Plunger 18 is movable by means of a lost motion driving connection with the skirt 120 of drive hub 16 between an inactive position illustrated in FIG. 2 and a vacuum-relief valve-activating position illustrated in FIG. 3. Referring primarily to FIGS. 1 and 5, plunger 18 is shown to include a central cam follower 150, an upstanding coupling member 152 on the top surface of follower 150, and a valve-biasing member 154 depending from the underside of follower 150. Coupling member 152 includes a pair of diametrically-opposed, radially outwardly-splayed snap prongs 156 for interconnecting the plunger 18 in the drive hub 16. Conveniently, each prong 156 includes a head 158 which, in addition to providing coupling means, also functions as a cam follower for riding on one of cylindrical cam surfaces 138$a,b$.

A pair of arcuate, helical ramps 160 are situated in radially outwardly-spaced relation from coupling member 152 and extend in an axially upward direction from the top surface of follower 150. Ramps 160 provide inverse cylindrical cams for receiving knife edge cam followers 146 and converting rotational motion of drive hub 16 into downward axial motion of plunger 18 toward its valve-activating position.

Each ramp 116 includes points of lowest inclination 162 and highest inclination 164 and extends approximately 70° about the central axis of plunger 18. A substantially flat "lost motion" region 166 is provided on the top surface of follower 150 extending through an angle of approximately 90° between the point of highest inclination of one of the ramps 160 and the point of lowest inclination of the other of the ramps 160 as shown best in the perspective view of FIG. 5. A second stop wall 168 extends axially upwardly from the edge of each "lost motion" region 166 to the point of highest inclination 164 of the adjacent ramp 160 as seen in FIG. 5.

Each plunger 18 further includes four resilient arcuate rotation-inhibiting fingers 170. Each finger 170 includes an L-shaped proximal end attached to the periphery of follower 150 and a pawl tooth 172 provided at its distal end. Each pawl tooth 172 includes an inclined surface 174 and is positioned to frictionally engage each of the axially-extending, radially inwardly-project ribs 176 circumferentially spaced about the interior wall of closure 22. It will be understood that fingers 170 function to provide frictional drag means which inhibit rotation of plunger 18 during the initial stages of rotation of the drive hub 16 in a cap-removal direction. Such frictional drag means facilitates camming conversion of rotational motion of drive hub 16 to axial motion of plunger 18. In addition, plunger 18 includes a skirt 180 depending from the underside of follower 150 and configured to define a space 182 surrounding valve-biasing member 154 for receiving one end of breakaway spring 26.

Annular race 20 is disposed for rotation between drive hub 16 and closure 22 as shown best in FIGS. 2 and 3. In use, race 20 is specially configured to establish a driving connection between shell 14 and closure 22 only after drive hub 16 has already moved plunger 18 to actuate vacuum-relief valve member 66, thereby enabling fuel vapor pressure in the filler neck 12 to be vented through the filler neck mouth 40 during cap removal, and only so long as the torque applied to drive hub 16 via shell 14 does not exceed a predetermined amount. Thus, race 20 acts to delay transmission of a rotation-inducing torque from shell 14 to closure 22 until after filler neck 12 has been vented via aperture 62 normally closed by vacuum-relief valve member 66.

Race 20 includes a set of peripherally spaced-apart axially inwardly-opening pockets 184. Referring to FIG. 4, each of pockets 184 includes an inclined camming surface 186, and a radially and axially-extending, abrupt locking surface 188. Flange 88 of closure 22 includes four peripherally extending resilient fingers 190. Fingers 190 are attached at their proximal ends to flange 88, and are provided at their distal ends with pawl teeth 192. Each tooth 192 has an inclined camming surface 194 and a radially and generally axially-extending locking surface 196. Surfaces 194, 186 of teeth 192 and pockets 184, respectively, cooperate to provide a torque-overriding connection of race 20 to closure 22 in the direction (counterclockwise in FIG. 4) which advances closure 22 into filler neck 12. Surfaces 196, 188 of teeth 192 and pockets 184, respectively, cooperate to provide direct connection of race 20 to closure 22 in the direction (clockwise in FIG. 4) which removes closure 22 from filler neck 12.

Race 20 also includes a radially inwardly-facing, peripherally-extending surface 198 which is provided with a radially inwardly-extending driven lug 210 and a radially inwardly-extending, rounded, anti-drift lug 212. Lugs 210 and 212 are circumferentially spaced apart in close proximity to one another as best seen in FIG. 4. Driven lug 210 is relatively larger than anti-drift lug 212 and includes a first driven surface 214 operative during installation of cap 10 on filler neck 12 and an oppositely-facing second driven surface 216 operative during removal of cap 10 from filler neck 12. As will be apparent from the description below, driven lug 134 receives a rotation-inducing drive torque from the one of the first and second drive members 124, 126 of the drive hub 16 during installation and removal of fuel cap 10. Further, anti-drift lug 136 intercepts pawl tooth 134 of anti-drift finger 132 effectively to block drifting rotation of drive hub 16 when cap 10 is mounted on filler neck 12 in the manner described above.

Fuel cap 10 is assembled in the following manner. The pressure-vacuum valve assembly 24 is installed in housing 44 provided in closure 22 and 0-ring gasket 38 is snapped into its position underneath flange 34 on the exterior surface of shank 30. Drive hub 16 and plunger 18 are coupled for limited relative rotation to provide a vent actuator unit by inserting snap prongs 156 into the hollow chamber defined by interior wall 136 and permitting heads 158 to snap into position riding on cylindrical camming surfaces 138. The vent actuator unit 16, 18, and race 20 are coupled for limited relative rotation by placing the radially outer portion of top disc 118 in an axially upwardly-opening recess 218 formed in race 20 as seen in FIG. 1. Shell 14 is then lowered onto drive hub 16 so that blades 122 of hub 16 protrude into recess 116 formed in handle 92 of the shell 14. One end of breakaway spring 26 is positioned on control plate 82 and the other end is inserted into recess 182 of plunger 18.

The subassembly comprising shell 14, drive hub 16, plunger 18, and race 20 is then lowered onto closure 22 so as to compress the breakaway spring 26. Retainer 28 is installed over shank 30 of closure 22 and moved toward flange 88 so that engaging means 220 detachably engages the mounting region 98 of shell 14. Thus, retainer 28 acts to trap top disc 118 of drive hub 16 and race 20 between shell 14 and flange 88 of closure 22, yet still allow relative rotation of the trapped pieces.

In its mounted position illustrated in FIGS. 2 and 3, the interior wall 114 of shell 14, the exterior surface of closure 22 at frangible portion 85, and an interior wall 222 of retainer 28 cooperate, in part, to define outlet deflector means for discharging fuel vapor vented through the pressure-vacuum valve housing 44. The deflected fuel vapor exits cap 10 through annular space 224 defined between the lower peripheral rim of retainer 28 and the outer edge of upper lip 40 of filler neck 12 as shown in FIGS. 2 and 3. Discharged fuel vapor is advantageously diffused as it is vented toward the exterior surface of filler neck 12 in a direction generally away from a person manually operating cap 10 during cap removal for inspection or refueling.

In operation, rotation of shell 14 in the cap-removal direction (counterclockwise in FIGS. 4 and 6-11) operates to move vacuum-release valve 66 from its closed position shown in FIG. 2 to its open position shown in FIG. 3 to enable pressurized fuel vapor to be vented from filler neck 12 through the outlet deflector means to the atmosphere. Advantageously, the valve actuating means 16, 18, and 26 interconnecting shell 14 and valve 66, as well as the closure removal means 16 and 20 interconnecting shell 14 and closure means 22, are configured so that rotation of shell 14 in a cap-removal direction will actuate valve 66 to enable the filler neck 12 and fuel tank (not shown) to be vented through closure 22 and filler neck mouth 40 without substantially rotating the closure 22 relative to filler neck 12 and breaking the primary seal established by gasket 38.

A preferred operating sequence illustrating both cap removal and installation is diagrammatically depicted in FIGS. 6-12. For illustrative purposes only, the elements (e.g. 190, 192, 184, etc. . . .) comprising the torque-override connection between race 20 and flange 88 of closure 22 are shown in the plane of the drawings instead of perpendicular to the plane of the drawings as shown in FIGS. 1-5. This artistic liberty has been taken to illustrate in pictorial form the activity of each interconnection/camming system in fuel cap 10 simultaneously at selected stages of operation of the cap. A preferred embodiment of this torque override connection is more fully illustrated in U.S. Pat. No. 4,280,345 which is hereby incorporated by reference. The arcuate fractured lines in race 20 indicate that the radially-inner section 226 (see FIG. 6) is ilustrated in the proper orientation while the radially-outer section 228 (see FIG. 6) is illustrated in the diagrammatic form described above.

Figure 6:
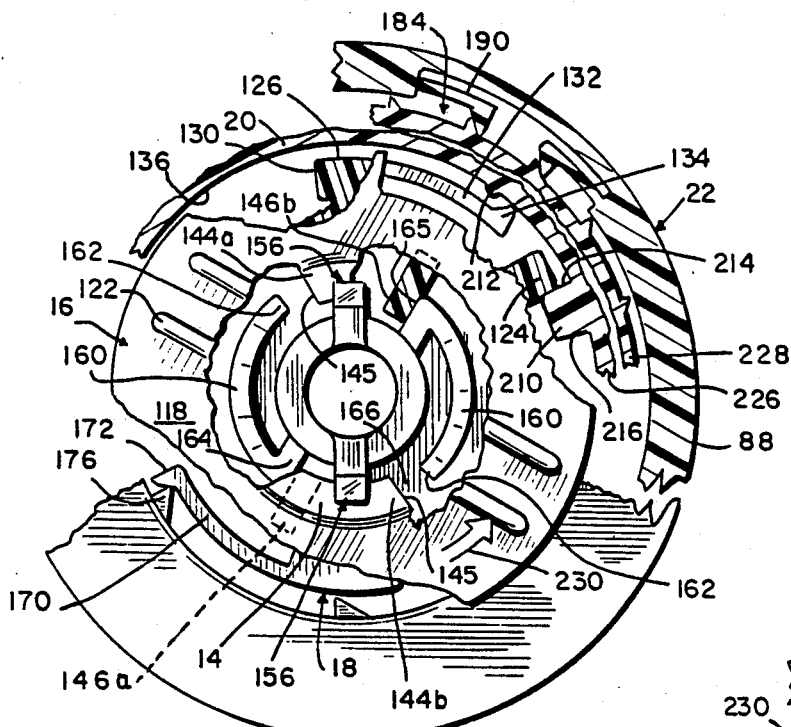
FIGS. 6–9 diagrammatically illustrate operation of fuel cap 10 with portions broken away in a cap-removal sequence.

FIG. 6 illustrates the relative position of the internal components of fuel cap 10 when the cap is tightly mounted on the filler neck 12 in the position shown in FIG. 2. In this orientation, spring 70 is permitted to urge vacuum-relief valve 66 to a position closing aperture 62. Cap removal is accomplished by gripping and then rotating shell 14 in the cap-removal direction represented by double arrow 230. Drive hub 16 is rotated in direction 230 due to engagement of blades 122 by interior wall 114. Rotating drive hub 16 sequentially acts to: (1) move valve 66 to its venting position shown in FIGS. 2 and 7, and, subsequently, (2) rotate closure 22 relative to filler neck 12 in direction 230.

Delayed actuation of valve 66 is accomplished in the following manner during cap removal. Each of knife edge cam drivers 146a, b rotates in direction 230 from an initial position abutting second stop 168 of ramp 160 across flat "lost motion" region 166 toward the point of lowest inclination 162 of ramp 160 during initial rotation of drive hub 16. Rotatable drive hub 16 is axially fixed within cap 10 while plunger 18 is free to rotate and reciprocate along an axial path relative to drive hub 16. Continued rotation of cam drivers 146 cause each driver 146 to ride on cylindrical cam surface 160 and convert rotational motion of drive hub 16 to axially downward motion of plunger 18. Provision of rotation-inhibiting fingers 170 aid such conversion by providing novel frictional drag means inhibiting rotation of plunger 18 during downward axially movement thereof.

It will be appreciated that provision of "lost motion" region 166 effectively delays initial downward movement of plunqer 18 and that the size of region 166 can be selected to "program" the period of this delay. Such a lost motion feature between drive hub 16 and plunger 18 permits shell 14 to rotate through a predetermined angle (e.g. about 90° in the illustrated embodiment) relative to filler neck 12 (or vice versa) without establishing an operative connection with the venting means 66. Such a feature advantageously improves the crashworthiness of fuel cap 10 in that the shell 14 can be rotated at least a predetermined amount as a result of impact during a vehicle rollover or other crash without opening a normally-closed aperture in a pressure-vacuum valve assembly 24 which might lead to the escape of liquid fuel to the atmosphere through closure 22.

It will be understood that the first and second drive members 124, 126 on drive hub 16 can be used to delay establishment of a driving connection between shell 14 and the closure member 22 irrespective of the inclusion of plunger 18 in fuel cap 10. Thus, provision of a "lost motion" connection between the shell 14 and the closure member 22 is applicable to threaded fuel caps to improve their crashworthiness whether or not such caps have pressure-relief vacuum valve assemblies.

Continuing to refer to FIG. 6, it will be seen that no driving connection between drive hub 16 and race 20 exists since the second drive member 126 of drive hub 16 has not yet been rotated in direction 230 to engage the second driven surface 216 of driven lug 210 on race 20. It will be understood that any rotation of race 20 in direction 230 will act to rotate closure 22 as long as the applied torque does not exceed a predetermined amount.

Figure 7:
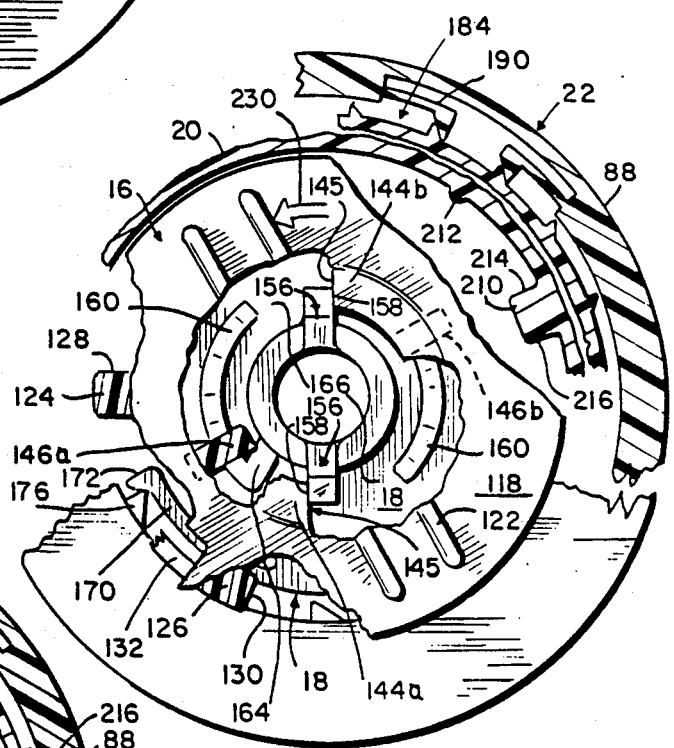

FIG. 7 illustrates the relative position of the internal components of fuel cap 10 when a vacuum-relief valve 66 is held in its venting position by the lowered valve-biasing member 154 but before a driving connection is established between drive hub 16 and race 20. Knife edge cam drivers 146a, b have travelled up ramp 160 and are positioned at the points of highest inclination 164 thereon. In this stage, drive hub 16 and plunger 18 are united for rotation due to engagement of each head 158 of snap prong 156 attached to plunger 18 by the first stop wall 145 in drive hub 16. At this stage, resilient fingers 170 are cammed radially inwardly and no longer act significantly to inhibit rotation of plunger 18. Valve-biasing member 154 continues to maintain the vacuum-relief valve 66 in its venting position during rotation of plunger 18 due to the smooth interface established therebetween as seen best in FIG. 3. It will be seen that first drive member 124 has been rotated away from the first driven surface 214 of driven lug 210 and second drive member 126 is advancing toward driving engagement with the second driven face 216.

At this stage, the operator will hear a hissing sound emanating from the fuel cap 10. This sound is produced by pressurized fuel vapor as it is discharging through the pressure-vacuum valve assembly 44. Such a sound provides an audible indication to the operator that venting through the closure member 22 is occurring, and that continued rotation of shell 14 in direction 230 should be delayed until the sound has ceased. So long as the operator uses the fuel cap 10 in the foregoing proper manner, pressurized fuel vapor will be vented, thereby permitting the pressure in the filler neck 12 and the fuel tank (not shown) to normalize.

Figure 8:
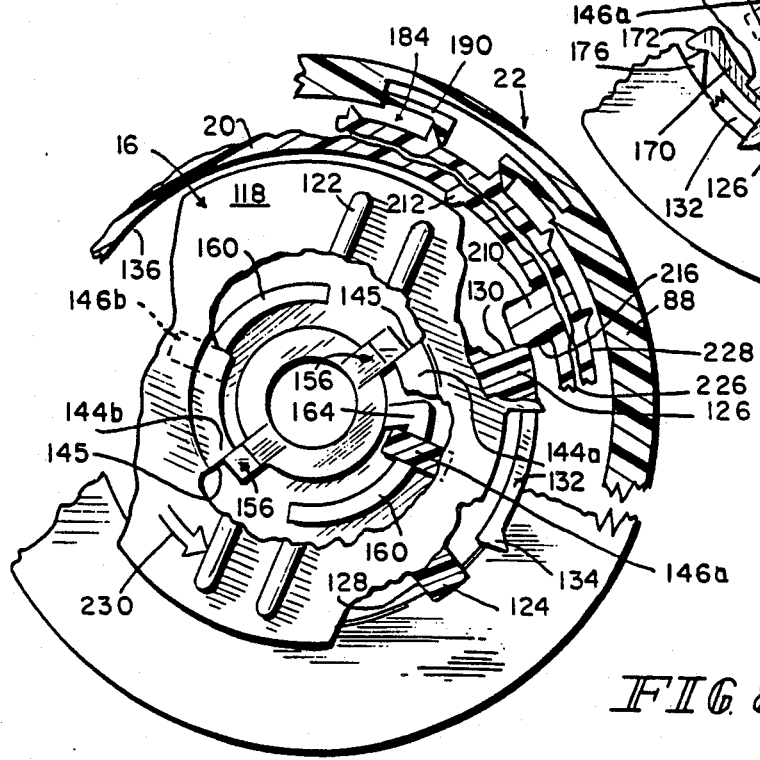
Figure 9:
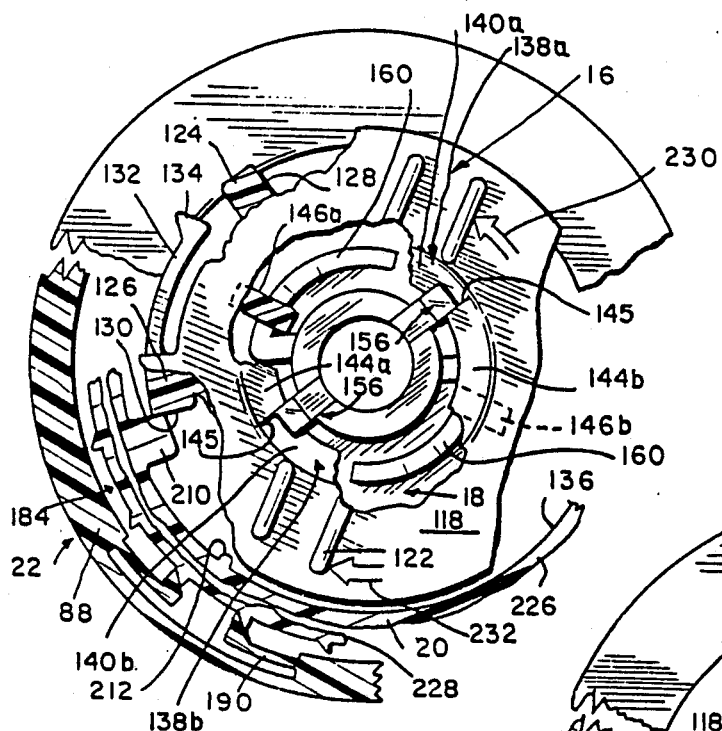

FIG. 8 illustrates the relative position of the internal components of fuel cap 10 when the drive surface 130 of second drive member 126 engages the second driven face 216 of driven lug 210. This engagement establishes a driving connection between drive hub 16 and race 20, thereby also establishing a driving connection between drive hub 16 and closure 22 as described above. FIG. 9 illustrates the fuel cap 10 as it might appear after removal from filler neck 12.

Installation of fuel cap 10 on the filler neck 12 is accomplished in the following manner. Rotation of shell 14 in the cap-advancing direction represented by double arrows 232 rotates drive hub 16 in direction 232. During such rotation, drive hub 16 sequentially acts to: (1) retract plunger 18 to its inactive position shown in FIG. 2, and, subsequently, (2) rotate closure 22 relative to filler neck 12 in direction 232.

Figure 10:
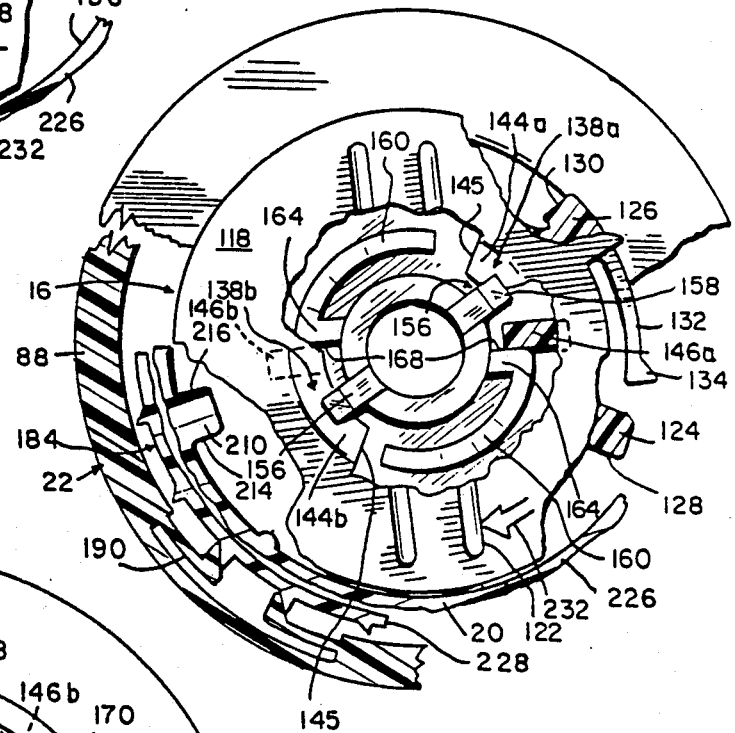
FIGS. 10 and 11 diagrammatically illustrate the operation of fuel cap 10 with portions broken away in a cap-installation sequence.

FIG. 10 illustrates the relative position of the internal components of fuel cap 10 after rotation of the drive hub 16 and the plunger 18 to close vacuum-relief valve 66, but before establishment of a driving connection between drive hub 16 and race 20. Valve 66 is moved to its closed position in the following manner. Cylindrical cam surface 138 is integral with drive hub 16 and rotates in direction 232 during cap installation. While rotation of plunger 18 is once again inhibited by resilient fingers 170, the rotating cylindrical cam surface 138 acts to ramp heads 158 of snap prongs 156 from lower flat section 140 as shown in FIG. 9 to upper flat section 144 as shown in FIG. 10, thereby lifting and moving plunger 18 in an axially-outward direction away from engagement with vacuum-relief valve 66.

Continued rotation of drive hub 16 causes each knife edge cam driver 146 (cam driver 146 having already travelled "down" ramp 160 from the point of highest inclination 164 to the point of lowest inclination 162 during the foregoing plunger-lifting step) to travel across "lost motion" region 166 and engage the second stop wall 168. Such an engagement establishes a driving connection between drive hub 16 and plunger 18 for united rotation in direction 232. However, at this stage, no driving connection has been established between drive hub 16 and race 20 inasmuch as first drive member 124 has not yet been rotated in direction 232 through an angle sufficient to engage driven lug 210 on race 20.

Figure 11:
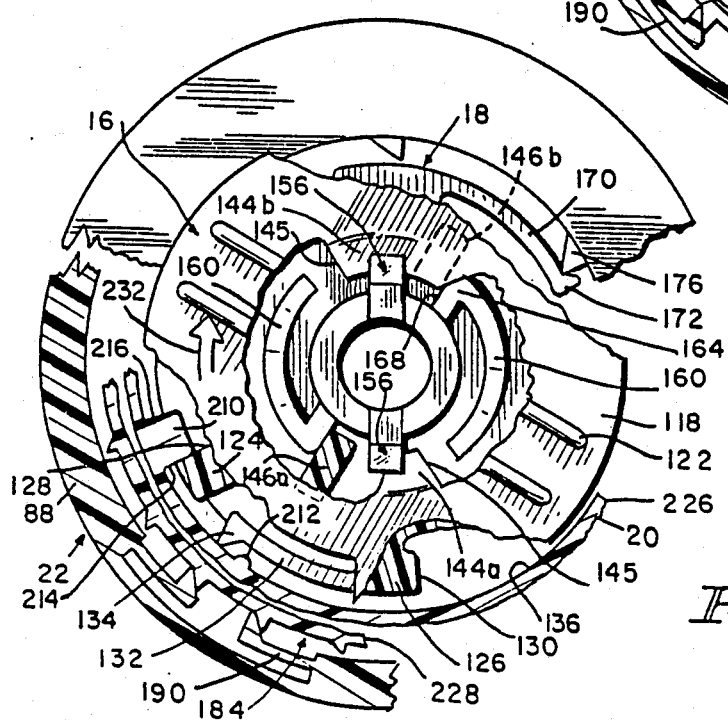

FIG. 11 illustrates the relative position of the internal components of fuel cap 10 after sufficient rotation of drive hub 16 to engage race 20 and drive closure 22 to its mounted position closing and sealing filler neck 12. Drive surface 128 of first drive member 124 is in engagement with first driven surface 214 of driven lug 210 to establish such an operative connection. It will be seen that the pawl tooth 134 of anti-drift finger 132 is positioned in the space along interior wall 136 of race 20 between first drive member 124 and anti-drift lug 212 to prevent drifting movement of drive hub 16 relative to race 20 and closure 22. At this stage, application of torque to race 20 in excess of the predetermined amount will override the driving connection between the drive hub 16 and closure 22 to prevent damage to the fuel cap 10.

A fuel cap breakaway condition is illustrated in FIG. 12. Application of a force represented by phantom double arrow 234 will not result in damage to pressure-vacuum valve assembly 24 due to the novel modular construction of fuel cap 10. During an accident situation, when fuel cap 10 is subjected to an impact of sufficient strength, the frangible portion 85 of closure 30 will fracture along fracture line 236 to allow the subassembly comprising shell 14, drive hub 16, plunger 18, race 20, and retainer 24 to be displaced from closure 22. The primary seal between flange 34 of closure 22 and upper lip 40 of filler neck 12 provided by gasket 38 will not be affected. Also, due to the modular construction, the spring 26 will urge the subassembly away from the pressure vacuum valve assembly 24 during a breakaway situation to preserve the integrity of the second filler neck seals provided therein.

Although the invention has been described in detail with reference to certain preferred embodiments, variations and modifications exist within the scope and spirit of the invention as described and defined in the following claims.

What is claimed is:

1. A fuel cap for use in a fuel system filler neck having a mouth, the cap comprising
   closure means rotatably engaging the filler neck for closing the filler neck,
   pressure-relief means for venting pressurized fuel vapor in the filler neck through the closure means, the pressure-relief means conducting the vented fuel vapor through the filler neck mouth to the atmosphere,
   shell means for providing a hand grip to permit rotation, and
   means for providing an operative connection between the shell means and the pressure-relief means such that rotation of said shell means relative to the filler neck in a cap-removal direction will actuate said pressure-relief means without substantially rotating the closure means relative to the filler neck.

2. A fuel cap for closing the threaded filler neck of a fuel tank, the cap comprising
   a housing having threads for engaging said filler neck,
   first sealing means on said housing for sealingly engaging said filler neck upon rotation of said housing in a first direction,
   second sealing means disposed within said housing for controlling fuel vapor within said fuel tank,
   a handle for rotating said housing relative to said filler neck, and
   means providing a driving connection between said handle and said second sealing means for activating said second sealing means to permit fuel vapor in said fuel tank to vent out of said filler neck upon rotation in a direction opposite said first direction without disengaging said first sealing means.

3. A fuel cap for use in a threaded fuel system filler neck having a mouth, the fuel cap comprising
   closure means rotatably engaging the threaded filler neck for closing the filler neck, the closure means including seal means for establishing a seal with the filler neck to block the escape of fuel and fuel vapor in the filler neck to the atmosphere,
   pressure-relief means extending through the closure means for venting pressurized fuel vapor in the filler neck through the closure means,
   shell means for providing a hand grip to permit rotation, and
   actuation means for providing an operative connection between the shell means and the pressure-relief means so that rotation of the shell means relative to the filler neck in a cap-removal direction will actuate the pressure-relief means without substantially rotating the closure means relative to the filler neck and breaking the seal established by the seal means.

4. The cap of claim 3, wherein the shell means and the closure means cooperate to define outlet-deflector means for discharging fuel vapor vented throuqh the closure means via the pressure-relief means from the cap to a region outside of the filler neck in a direction toward the filler neck and generally away from a person manually rotating the shell means.

5. The cap of claim 3, wherein the closure means includes an inner surface defining a first venting aperture and providing a valve seat surrounding the venting aperture, the pressure-relief means including a pressure-relief valve formed to include a second venting aperture, a vacuum-relief valve positioned in the first venting aperture, first means for yieldably biasing the pressure-relief valve in an axially inward direction against the valve seat normally to close the first venting aperture, and second means for yieldably biasing the vacuum-relief valve in an axially outward direction against the pressure-relief valve normally to close the second venting aperture, and the actuation means includes means for moving the vacuum-relief valve against the second biasing means to open the second venting aperture in response to rotation of the shell means relative to the filler neck.

6. The cap of claim 5, wherein the moving means includes a drive hub coupled to the shell means for rotation therewith, a plunger axially movable in the closure means between an inactive position and a vacuum-relief valve-actuating position, and first camming means interconnecting the drive hub and plunger for urging the plunger in an axial direction toward its vacuum-relief valve-actuating position in response to rotation of the drive hub in the cap-removal direction.

7. The cap of claim 6, wherein the actuation means further includes frictional drag means for releasably inhibiting rotation of the plunger during axial movement toward its vacuum-relief valve-actuating position.

8. The cap of claim 6, wherein the first camming means includes at least one cam driver depending from the drive hub, at least one inverse cylindrical cam on the plunger in engagement with the at least one cam driver, the at least one cam having an axis of rotation and being configured to impart rectilinear motion to the plunger in response to rotation of the at least one cam driver during rotation of the drive hub in the cap-removal direction so that the direction of plunger motion is substantially parallel to the axis of rotation of the at least one cam.

9. The cap of claim 6, wherein the actuation means further includes means for urging the plunger toward its inactive position in response to rotation of the drive hub in a direction opposite the cap-removal direction during installation of the cap on the filler neck.

10. The cap of claim 6, further including second camming means interconnecting the drive hub and plunger for returning the plunger from said vacuum-relief valve-actuating position to said inactive position in response to rotation of the drive hub in a direction opposite the cap-removal direction during installation of the cap on the filler neck.

11. The cap of claim 10, wherein the second camming means includes at least one cylindrical cam on the drive hub and at least one upstanding cam follower on the plunger in engagement with the at least one cam, the at least one cam having an axis of rotation and being configured to impart rectilinear motion to the plunger in response to rotation of the at least one cam during rotation of the drive hub in said opposite direction so that the direction of plunger motion is substantially parallel to the axis of rotation of the at least one cam.

12. A fuel cap for use in a fuel system threaded filler neck having a mouth, the fuel cap comprising
   closure means rotatably engaging the threaded filler neck for closing the filler neck, the closure means including seal means for establishing a seal with the filler neck to block the escape of fuel and fuel vapor in the filler neck to the atmosphere,
   pressure-relief means extending through the closure means for venting pressurized fuel vapor in the filler neck through the closure means,
   shell means for providing a hand grip to permit manual rotation, and
   actuation means for providing an operative connection between the shell means and the pressure-relief means so that rotation of the shell means relative to the filler neck in a cap-removal direction will actuate the pressure-relief means without substantially rotating the closure means relative to the filler neck and breaking the seal established by the seal means, the actuation means includes hub means interconnecting the closure means and the shell means for applying a torque to the closure means after a predetermined amount of movement of the shell means relative to the filler neck so that a lost-motion connection is established between the closure means and the shell means to delay rotation of the closure means during cap removal, thereby permitting pressurized fuel vapor to be vented via the pressure-relief means through the filler neck mouth to the atmosphere before the seal established by the seal means is broken as the cap is removed from the filler neck and during rotation of the shell means through said predetermined amount of movement.

13. The cap of claim 12, wherein the pressure-relief means includes a venting aperture and vacuum-relief valve means for selectively admitting ambient air into the filler neck through the venting aperture when vacuum conditions exceed a predetermined amount, and the hub means includes plunger means for actuating the vacuum-relief valve means in response to rotation of the shell means relative to the filler neck prior to application of a rotation-inducing torque to the closure means to permit pressurized fuel vapor to be vented through the venting aperture without breaking the seal established by the seal means.

14. The cap of claim 13, wherein the hub means, the shell means, and an interior surface of the closure means cooperate to define bypass means for conducting pressurized fuel vapor along a tortious path bypassing the seal means from the venting aperture to the atmosphere, the shell means being configured to define outlet means for discharging vented fuel vapor conducted via the bypass means in a direction toward the filler neck so that fuel vapor vented through the fuel cap along the tortious path is discharged in a direction generally away from a person rotating the shell means during removal of the cap from the filler neck.

15. A fuel cap for closing a fuel system threaded filler neck having a mouth, the cap comprising
   housing means for providing a housing engaging and closing said filler neck,
   a cover for rotating said housing relative to said filler neck,
   vent path means for providing a controllable vent path through said housing means,
   means providing a driving connection between said cover and said vent path means for opening said vent path means to permit fuel vapor in said fuel system to vent out of said filler neck through said filler neck mouth upon rotation in a selected direction preparatory to rotating said housing means within said filler neck.

16. The cap of claim 15, wherein said driving connection means comprises a plunger configured to move axially within said housing means.

17. The cap of claim 16, wherein said driving connection means further comprises displacing means for axially displacing said plunger within said housing means in response to rotational movement of said cover.

18. The cap of claim 17, wherein said vent means comprises a pressure-vacuum valve.

19. The cap of claim 18, wherein said plunger is configured to displace a portion of said pressure-vacuum valve when said plunger is moved axially downwardly by said displacing means to release said fuel vapor from said fuel tank.

20. The cap of claim 19, wherein said cover is configured to rotate freely around said housing means during an initial portion of the rotation in the first direction followed by engaging rotation with respect to said housing means to threadingly engage said housing means with said filler neck, and said cover is configured to rotate freely around said housing means during an initial portion of the rotation in the direction opposite said first direction followed by engaging rotation with respect to said housing means to threadingly disengage said housing means from said filler neck.

21. The cap of claim 20, wherein said cover and said displacing means cooperate to move said plunger axially downwardly to displace a portion of said pressure-vacuum valve during a predetermined part of the initial portion of the rotation of said cover in the direction opposite said first direction to permit said fuel vapor to begin venting, and wherein said cover and said displacing means also cooperate to provide means for sustaining a venting of the fuel vapor during continued rotation of the cover through a remaining part of the initial portion of the rotation in the direction opposite said first direction and before said cover engages said housing means to threadingly disengage said housing means from said filler neck.

22. A fuel cap rotatably engageable with a fuel system filler neck having a mouth, the fuel cap comprising
   closure means for closing the filler neck, the closure means including a body member threadedly engaging the filler neck,
   seal means for establishing a fuel vapor seal between the body member and the filler neck,
   a handle rotatable between a cap-retaining position and a cap-removing position, and
   actuation means responsive to rotation of the handle in a cap-removal direction for creating a fuel vapor-conducting vent path between the filler neck and the atmosphere through the sealed closure means, the actuation means maintaining the seal established by the seal means during a predetermined amount of rotation of the handle in a cap-removal direction from its cap-retaining position to accommodate discharge of fuel vapor through the vent path prior to breaking the seal established by the seal means.

23. The fuel cap of claim 22, wherein the handle and the closure means cooperate to define deflector means for directing fuel vapor discharged through the vent path by the actuation means toward an exterior surface of the filler neck and generally away from a person rotating the handle in the cap-removal direction.

24. The fuel cap of claim 22, wherein the actuation means further includes drive means for applying a rotation-inducing torque to the closure means during continued rotation of the handle past said predetermined amount of rotation, the drive means establishing a lost-motion connection between the handle and the closure means to delay rotation of the closure means relative to the filler neck and breakage of the seal established by the seal means until after the pressure in the filler neck has substantially normalized due to discharge of pressurized fuel vapor through the vent path.

25. A fuel cap for use in a threaded filler neck of a fuel system, the fuel cap comprising
closure means for closing the filler neck, the closure means including seal means for establishing a fuel vapor seal with the filler neck and valve means for normalizing the fuel vapor pressure in the filler neck,
a rotatable lid covering the closure means for actuating the valve means to vent the filler neck without breaking the seal established by the seal means, and
coupling means for interconnecting the lid and the closure means to permit selective rotation of the lid relative to the closure means, the coupling means including actuation means for selectively actuating the valve means in response to a predetermined amount of rotation of the lid from an initial position while the closure means is stationary relative to the filler neck.

26. The fuel cap of claim 25, wherein the lid and the closure means cooperate to define deflector means for directing fuel vapor discharged through the valve means by the actuation means toward an exterior surface of the filler neck and generally away from a person rotating the lid in a cap-removal direction.

27. The fuel cap of claim 25, wherein the actuation means further includes drive means for applying a rotation-inducing torque to the closure means during continued rotation of the handle past said predetermined amount of rotation, the drive means establishing a lost-motion connection between the lid and the closure means to delay rotation of the closure means relative to the filler neck and breakage of the seal established by the seal means until after the pressure in the filler neck has substantially normalized due to discharge of pressurized fuel vapor through the valve means.

28. A fuel cap rotatably engageable with a threaded filler neck of a fuel system, the fuel cap consisting of
closure means for closing the filler neck, the closure means including a seal member, a support member for trapping the seal member against the filler neck to block the escape of fuel vapors in the filler neck to the atmosphere, and means for controlling fuel vapor pressure in the filler neck, the controlling means including pressure-relief means for venting the filler neck to the atmosphere when the pressure in the filler neck exceeds a predetermined superatmospheric level so that pressurized fuel vapor is exhausted from the filler neck and vacuum-relief means for venting the filler neck to the atmosphere when the pressure in the filler neck drops below a predetermined subatmospheric level so that air is allowed to pass through the closure means into the filler neck,
a cover overlying the closure means and rotatable about the axis of rotation of the fuel cap, and
actuation means for actuating the vacuum-relief valve means in response to rotation of the cover relative to the closure means to permit fuel vapor to vent out of the filler neck, the actuation means providing a driving connection between the cover and the controlling means.

29. A pressure-vacuum fuel cap for a vehicle fuel tank having a filler neck formed with a sealing surface concentric with the longitudinal axis of the neck, the fuel cap comprising
a rotatable cover,
closure means for providing a concentric housing extending downwardly to engage and close the filler neck, the closure means including a valve body providing a centrally disposed concentric passageway extending axially therethrough and in communication with the tank,
valve means disposed in the passageway for normalizing the pressure in the tank, the valve means including pressure-relief means for venting the tank to the atmosphere when the pressure in the tank exceeds a predetermined superatmospheric level so that pressurized fuel vapor is exhausted from the tank and vacuum-relief means for venting the tank to the atmosphere when the pressure in the tank drops below a predetermined subatmospheric level so that air is allowed to pass through the closure means into the tank, and
means for actuating the vacuum relief means in response to rotation of the cover relative to the filler neck in a cap-removal direction to normalize the pressure in the tank prior to removal of the fuel cap from the filler neck.

30. The cap of claim 29, wherein the filler neck includes an exterior surface, and the cover and the closure means cooperate to define deflection means situated outside the filler neck for directing the flow of pressurized fuel vapor vented by the vacuum-relief means during operation of the actuating means toward a region in close proximity to the exterior surface of the filler neck and away from a user gripping the cover during removal of the cap from the filler neck.

31. The cap of claim 29, wherein the actuating means includes a drive hub coupled to the cover for rotation therewith, a plunger axially movable in the closure means between an inactive position and a pressure-relief position, and camming means interconnecting the drive hub and plunger for urging the plunger toward its pressure-relief position in response to rotation of the drive hub in the cap-removal direction.

32. The cap of claim 31, wherein the actuating means further includes means for urging the plunger toward its inactive position in response to rotation of the drive hub in a direction opposite the cap-removal direction.

33. The cap of claim 31, wherein the actuating means further includes frictional drag means for releasably inhibiting rotation of the plunger during movement thereof toward its pressure-relief position.

34. The cap of claim 29, wherein the valve body includes an axially outwardly-facing, radially inwardly-extending surface being formed to include a vent opening for the passageway and providing a seat surrounding the vent opening, said pressure-relief means includes a first valve member exposed to pressure in the tank having an axially inner surface formed to include a central aperture and first biasing means for yieldably biasing the first valve member against the seat normally to close the vent opening, said vacuum-relief means includes a second valve member disposed in the central aperture of the first valve member and second biasing means for biasing the second valve member against the axially inner surface of the first valve member normally to close the central aperture, and said actuating means includes plunger means for urging the second valve member in opposition to the second biasing means from a normally closed position to a pressure-relief position in response to rotation of the cover relative to the filler neck, thereby opening the central aperture in the first valve member to allow pressurized fuel vapor in the filler neck to be vented to the atmosphere through the cap.

35. The cap of claim 34, wherein the actuating means includes hub means for interconnecting the closure means and the cover, the hub means being coupled to the cover for rotation therewith and including camming means for moving the plunger means to said pressure-relief position in response to a predetermined amount of rotation of the hub means relative to the filler neck in the cap-removal direction so that the central aperture is open to initiate venting activity, and drive means for applying a torque to the closure means after a further predetermined amount of rotation of the hub means relative to the filler neck so that a lost-motion connection is established between the closure means and the cover to delay rotation of the closure means during cap removal so that pressurized fuel vapor is released to the atmosphere over a period of time corresponding to the duration of the lost-motion connection.

36. The cap of claim 34, wherein the actuating means includes a drive hub having first and second drive lugs, a race disposed for rotation between the cover and the drive hub, the race cooperating with the closure means to provide a positive connection in the cap-removal direction and a torque-limited connection in the cap-advancing direction, the race including a driven lug having first and second faces, the first drive lug of the drive hub engaging the first face of the driven lug of the race during rotation of the drive hub in the cap-removal direction to impart a rotation-inducing force to the race and the closure means, the second drive lug of the drive hub engaging the second face of the driven lug of the race during rotation of the drive hub in the cap-advancing direction to impart a rotation-inducing force to the race and the closure means.

37. The cap of claim 36, wherein the actuating means further includes anti-drift means for releasably limiting rotation of the drive hub relative to the race within a predetermined angular amount when the second drive lug of the drive hub is in driving engagement with the second face of the driven lug so that drifting rotation of the drive hub is substantially blocked when the fuel cap is mounted on the filler neck.

38. A fuel cap for use in a threaded fuel system filler neck having a mouth, the fuel cap comprising
closure means rotatably engaging the threaded filler neck for closing the filler neck, the closure means including seal means for establishing a seal with the filler neck to block the escape of fuel and fuel vapor in the filler neck to the atmosphere,
pressure-relief means extending through the closure means for venting pressurized fuel vapor in the filler neck through the closure means, the pressure-relief means conducting the vented fuel vapor through the filler neck mouth to the atmosphere,
shell means for providing a hand grip to permit rotation,
actuation means for providing an operative connection between the shell means and the pressure-relief means so that rotation of the shell means relative to the filler neck in a cap-removal direction will actuate the pressure-relief means without substantially rotating the closure means relative to the filler neck and breaking the seal established by the seal means,
means for controlling the fracture of the shell means and the actuation means from the closure means when the shell means is exposed to an impact, and
means for ejecting said shell means and said actuation means away from said closure means after said shell means and said actuation means are separated from said closure means by said fracture control means.

39. The fuel cap of Claim 38, wherein said ejecting means comprises spring means for resiliently urging the actuation means and the shell means away from the closure means.

40. A fuel cap for use in a threaded fuel system filler neck, the fuel cap comprising
shell means for providing a hand grip,
closure means for sealingly closing the filler neck, the closure means including frangible means for connecting to the shell means,
valve means in the closure means for normalizing the fuel vapor pressure in the filler neck,
actuation means for operating the valve means in response to rotation of the shell means relative to the closure means through a predetermined angle, and
safety means for ejecting the shell means and the actuation means upon fracture of the frangible means under a load without penetrating the valve means sufficiently to form a liquid fuel-conducting path through the closure means from the filler neck to the atmosphere.

41. A fuel cap for closing the threaded filler neck of a fuel tank, the cap comprising
a housing having threads for engaging the filler neck,
sealing means for sealingly engaging said filler neck upon rotation of the housing in a first direction,
a handle for rotating the housing relative to the filler neck, and
hub means providing a lost motion driving connection between the handle and the housing, the lost motion of the hub means acting to permit a predetermined amount of relative movement of the handle and the filler neck before rotating the housing relative to the filler neck sufficiently to break the seal provided by the sealing means.

42. A fuel cap for use in a fuel system filler neck having a mouth, the cap comprising
closure means rotatably engaging the filler neck for closing the filler neck,
the closure means including seal means for establishing a seal with the filler neck to block the escape of fuel and fuel vapor in the filler neck to the atmosphere,
shell means for providing a hand grip to permit rotation, and means interconnecting the shell means and closure means for applying a torque to the closure means after a predetermined amount of relative movement of the shell means and the filler neck to establish a lost motion connection between the closure means and the shell means to delay breaking the seal provided by the seal means until after said predetermined amount of relative movement of the shell means and the filler neck has occurred.

* * * * *